United States Patent [19]
Langewis

[11] 3,864,995
[45] Feb. 11, 1975

[54] CAN TRIMMER DEVICE
[75] Inventor: Cornelis Langewis, Walnut Creek, Calif.
[73] Assignee: Kaiser Aluminum & Chemical Corporation, Oakland, Calif.
[22] Filed: Dec. 11, 1973
[21] Appl. No.: 423,716

Related U.S. Application Data
[63] Continuation-in-part of Ser. No. 326,159, Jan. 24, 1973, Pat. No. 3,802,363.

[52] U.S. Cl.............................. 82/54, 82/58, 82/101, 82/82
[51] Int. Cl........ B23b 3/06, B23b 3/04, B23b 5/14
[58] Field of Search .............. 82/46, 47, 48, 54, 57, 82/58, 70.2, 82, 101

[56] References Cited
UNITED STATES PATENTS
2,298,366 10/1942 Gladfelter et al..................... 82/101
2,701,015 2/1955 Gottschalk........................... 82/101
3,359,841 12/1967 Cvacho et al........................... 82/82
3,400,620 9/1968 Armbruster et al. .................. 82/47

Primary Examiner—Harrison L. Hinson
Attorney, Agent, or Firm—Paul E. Calrow; John S. Rhoades

[57] ABSTRACT

Improved can trimmer device for circumferentially trimming the ragged edge of an open ended metal can wherein a rotatable mandrel, that includes a uniquely biased solid cutting anvil, is utilized to engage a metal can from the inside in an improved fashion and to cooperate with a rotatable outside cutter head for cleanly cutting and severing the ragged edge from the open end portion of a can body in the form of a scrap ring.

25 Claims, 10 Drawing Figures

CAN TRIMMER DEVICE

RELATED APPLICATIONS

This application is a continuation-in-part of my copending application Ser. No. 326,159, filed Jan. 24, 1973, Now U.S. Pat. No. 3,802,363, issued Apr. 9, 1974.

BACKGROUND OF THE INVENTION

The present invention relates to a trimming device for trimming the open ends of metal cans, such as those made from ferrous metals or aluminum and which have been drawn and ironed on a draw and iron press or merely drawn or impact extruded, etc. and constitutes an improvement over that disclosed in my prior copending application Ser. No. 326,159, filed Jan. 24, 1973. In instances where can trimming devices have been incorporated in can lines involving drawn and iron presses such as the can trimming device of U.S. pat. No. 3,425,251, the operation of the trimming device unfortunately was not always fully coordinated with the operations of the draw and iron press. If the trimmer speed is not fully coordinated with that of the press and actually lags behind that of the press, the press ordinarily must be stopped until the trimming operation catches up with the press operation. On the other hand, if the trimming operation speeds exceed those of the press to any great extent, there is the possibility of line jams. In mass production operations, these various factors can result in undesirable and unfortunate delays and slow downs in an overall can line.

A further problem exists in the case of where lightweight and thin walled aluminum cans are being produced and handled. Because of the lightweight and thinness of the walls, for example, the wall thickness may be on the order of 0.005 to 0.006 inch in thickness and the can weight only 17 grams, the can will not take rough handling or abuse without becoming severely dented and unusable. In order to prevent or minimize rough handling of such containers that can lead to crushing or crumpling of the cans and possible can line jams, etc., the cans should be handled as gently as possible and as small a number of times as possible. For this reason, as indicated in prior art U.S. Pat. 3,270,544, it is desirable to locate the trimmer as close as possible to the draw and iron press. This tends to minimize the time between can formation and can trimming and the number of times a can is individually handled and/or transferred and thus minimizes can damage. Other problems existant in the prior art as represented, for example, by prior art U.S. Pat. Nos, 2,298,366, 2,455,768, 2,575,104, 3,130,698, 3,548,769, 3,581,691, and 3,756,103, concern trimming equipment having slow acting elements or elements that penetrate for a substantial distance into and/or substantially fill the inside of the cans during trimming of the cans. These are additional factors that can result in the consumption of valuable seconds of time in engaging, handling and transferring cans to and from the trimmer devices and other can line equipment and unless all of the equipment in a can line is fully synchronized can result in or enhance the possibility of damaged and unusable cans, can line failures and equipment down time.

SUMMARY OF INVENTION

In an effort to avoid the aforementioned difficulties and problems of prior art trimmer devices and in order to provide a trimmer device that is particularly usable with cans made of lightweight material, such as aluminum as well as steel, etc., the improved trimmer device of the instant invention is provided with a mandrel having a novel resiliently biased rigid cutting anvil in lieu of the individually expandable finger elements of my prior copending application Ser. No. 326,159. The anvil of the instant invention can be mounted in a unique fashion on a carriage located adjacent or next to the exit end of the tool pack of an appropriate draw and iron press or other can forming press. This carriage can be advantageously moved or driven to and fro by the main drive of the press in order to insure full synchronization of the operations of the trimmer device and the particular draw and iron press with which it is associated.

The rotatable mandrel and biased rigid cutting anvil of the improved trimming device of the instant invention penetrate but a limited amount or in a shallow fashion into the open end of a container or can in a manner somewhat analogous to the can flanging operation of U.S. Pat. No. 3,260,089, but without the attendant problems. This shallow mandrel penetration avoids prolonged operations of individual pieces of can handling equipment while still providing full support of the can body in the trimming area during trimming and full registry of the can body with the trimmer cutting tools. The small depth of penetration at least provides the minimum amount required firstly to successively, firmly and gently grasp an open ended can, secondly to effect its displacement slightly from a conveyor such as the pocket of an indexing-type starwheel device and, thirdly, to support it firmly yet gently for a sufficient period of time and free of the starwheel device to allow an outside rotatable cutter also forming part of the trimming device to cooperate with an inside cutter in penetrating and cutting the ragged can edge from the can in the desired non-spiral fashion. After trimming the can is allowed to drop and settle back into its associated carrying pocket on the starwheel conveyor for translation to a further treatment and/or handling station, etc.

Accordingly, it is a primary purpose of the instant invention to provide an improved metal can body trimming device which can be readily incorporated in an overall metal can forming and processing line while its operations are fully synchronized with the operations of such a line, as well as a device which handles the metal can being trimmed only a minimal amount. The trimmer is advantageously resiliently biased and located substantially directly adjacent the tool pack end of a draw and iron press and it can be powered by the main drive mechanism of the draw and iron press through a suitable power takeoff. This direct power takeoff tends to assure full coordination and synchronization between the operations of press, trimmer and the rest of the can line, because unless each open ended can is properly trimmed at its open end, it ordinarily cannot be properly handled and/or transported by the remaining equipment making up a can processing line, such as washers, dryers, inside and outside can coaters, neckers and flangers.

DETAILED DESCRIPTION

Figure 1:
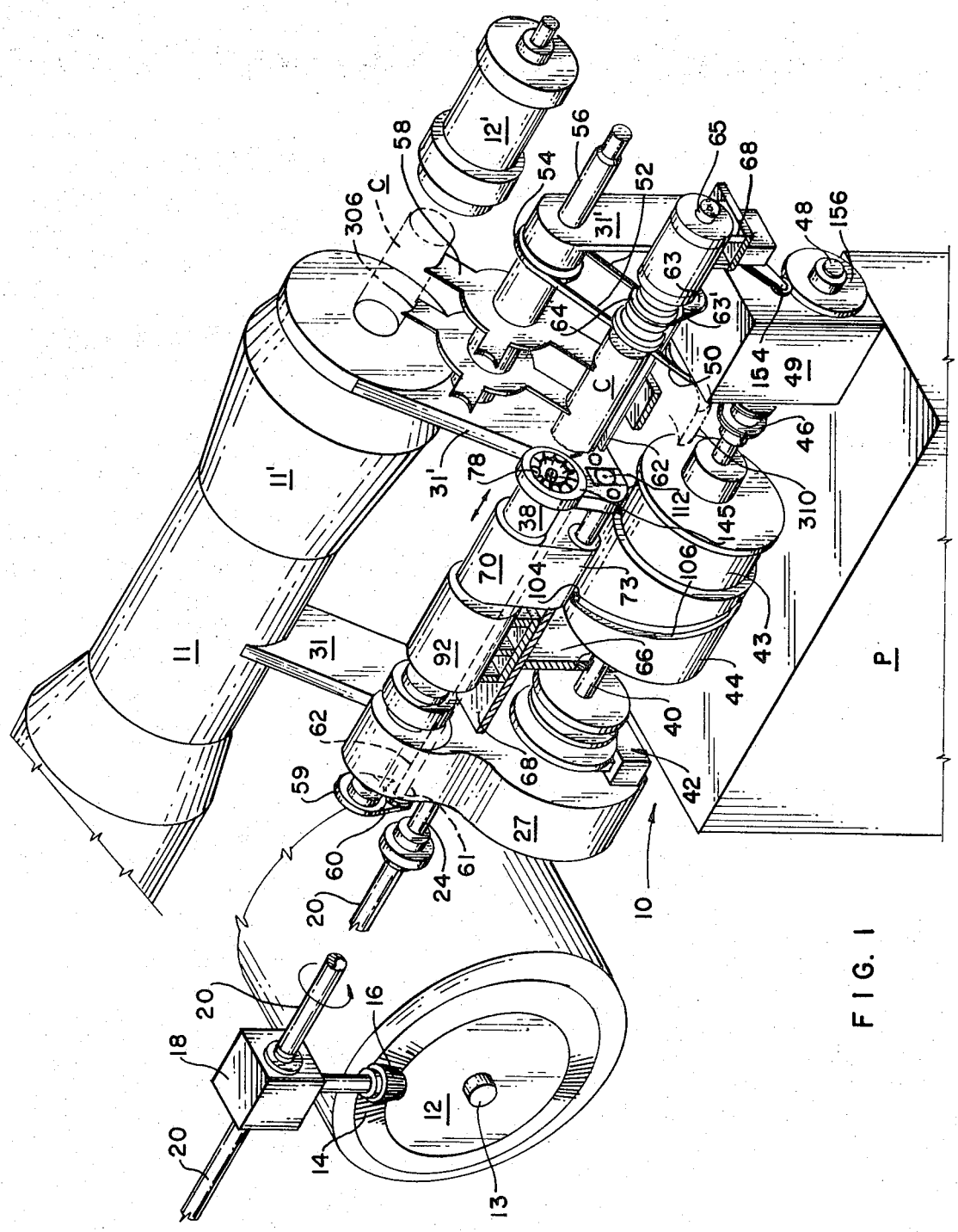
FIG. 1 is an overall partially schematic and partially diagrammatic view of the container trimmer of the instant invention with parts removed and illustrates how the trimmer can be located adjacent to and driven by a draw and iron press used to produce deep drawn metal cans.
Figure 2:
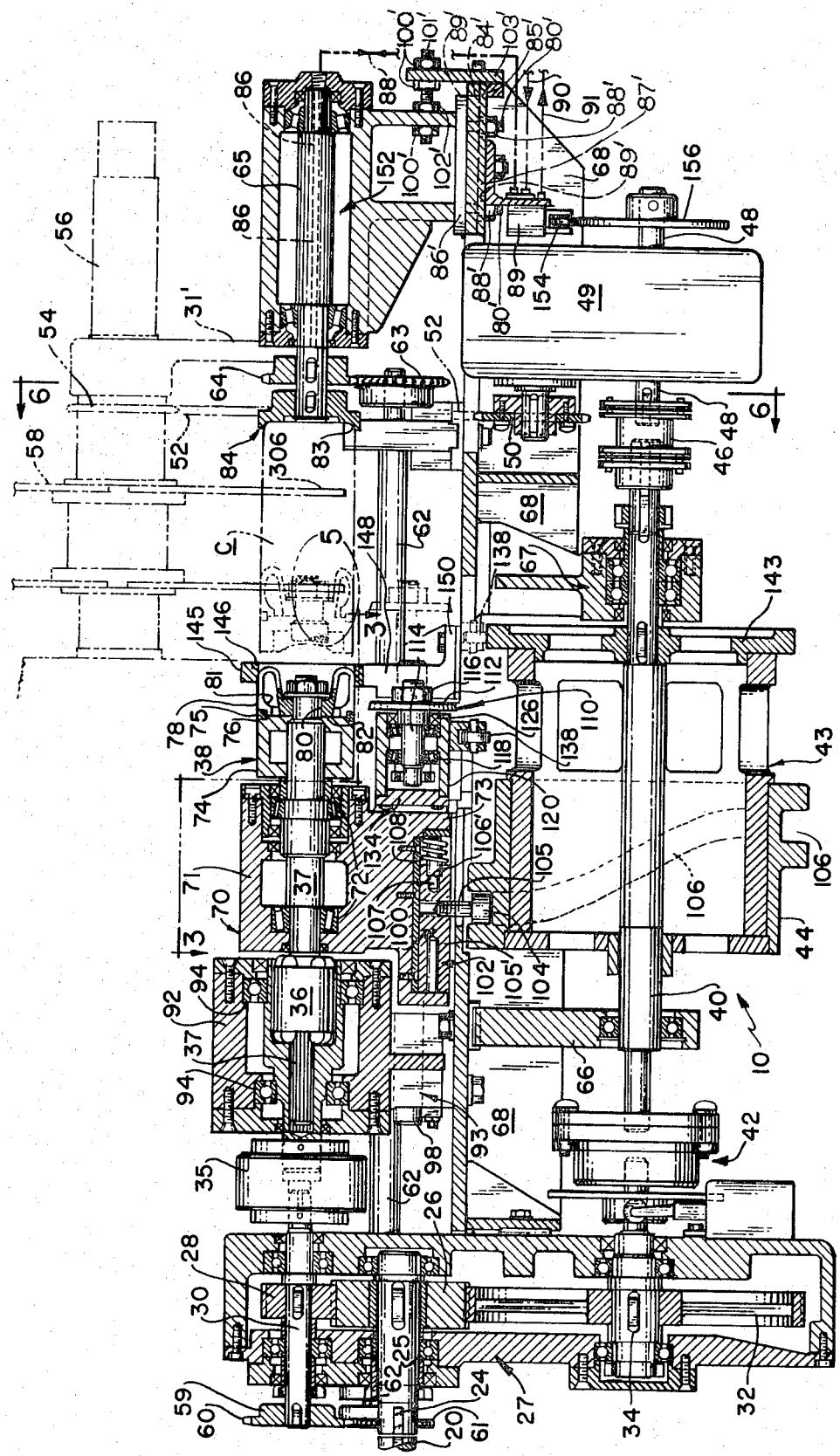
FIG. 2 is an overall sectional view of the trimmer device of the instant invention.

With further reference to the drawings and, in particular, FIGS. 1 and 2, the metal can body trimmer 10 of the instant invention can be located adjacent to the tool pack end of a double acting deep draw and iron press or can bodymaker 11 of the type generally shown in U.S. Pat. No. 3,496,756 which issued Feb. 24, 1970. It is to be understood, of course, that while the trimmer of the instant invention will be discussed with particular reference to its use with a press of the type shown in U.S. Pat. No. 3,496,756, it can be used equally well with a single acting draw and iron press of the type shown, for example, in U.S. Pat. No. 3,289,453 which issued Dec. 6, 1966, and other can forming presses.

As indicated in U.S. Pat. No. 3,496,756, the double acting press is equipped with punches and tooling at each end so that a metal container can be drawn and ironed in each direction of movement of a primary piston the opposite sides of which are connected to separate forming punches. A power takeoff in the form of a main bevel gear 12 is affixed to the shaft 13 and shaft 13 can constitute an extension of the main crankshaft of the press 11. The teeth 14 of gear 12 mesh with the teeth of smaller bevel gear 16. Gear 16 is connected by way of appropriate shafts and bevel gear assemblies in gear box 18 to the opposing shafts 20 that drive the separate trimmers 10 located at opposite ends of the press 11. Since the trimmers 10 at each end of the press are substantially identical to each other in construction and operation, a description of one will suffice for both.

As indicated particularly in FIG. 2, the elongated drive shaft 20 can be suitably coupled to the secondary drive shaft 24 mounted in suitable bearings 25 carried by a housing 27. Shaft 24 supports and drives a gear 26 which meshes with an upper gear 28 mounted on a shaft 30 in the gear housing 27 and a lower and relatively large gear 32 mounted on a lower shaft 34 also disposed in housing 27 that can be at least partly suspended from the barrel of press 11 adjacent the tool pack section 11' and bottoming die 12' of the press by a bracket assembly 31 diagrammatically shown in FIG. 1. Shaft 30 is ultimately connected by a suitable coupling assembly 35 to the splined shaft and bearing assembly 36 for the rotating can body receiving mandrel 38. Assembly 36 is provided with the usual standard spline elements so that the splined mandrel shaft 37, while still maintaining driving engagement with the shaft 30, can be shifted laterally with respect thereto in a manner to be described more fully hereinafter. Lower shaft 34 is coupled to a further shaft 40 by means of a standard override coupling and clutch assembly 42.

Figure 6:
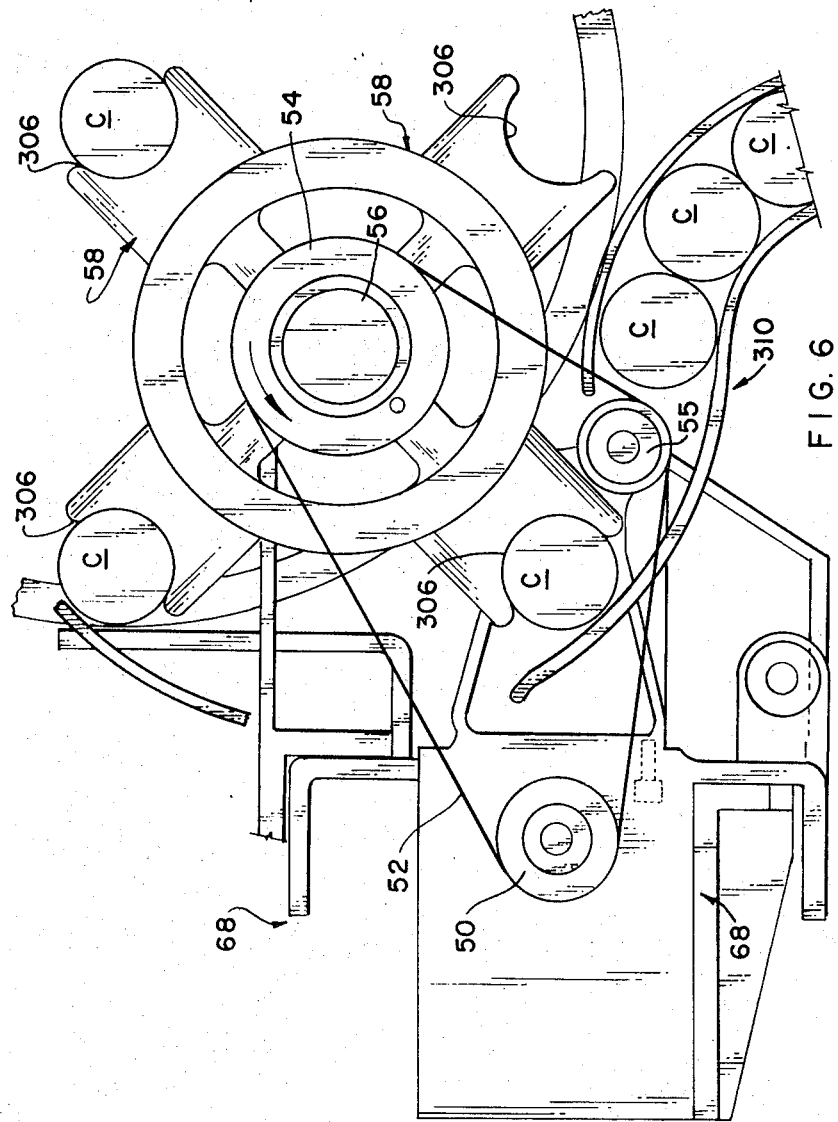
FIG. 6 is an end view of the apparatus of FIG. 2 when taken generally along the line 6-6 thereof and with parts added and other parts removed.

A drum element 43 is mounted upon shaft 40 and a cam sleeve 44 is fitted about and removably yet rigidly affixed to the outside of drum 43 in a manner well known in the art. Shaft 40 is ultimately connected by a coupling 46 to one end of a shaft 48 which projects from a standard starwheel conveyor indexing mechanism 49 of the type sold by the Commercial Cam Company of Chicago, Ill. under Model No. 250-P-4H20-90. A sprocket 50 driven by mechanism 49 is connected by chain 52 to the sprocket 54 affixed to the shaft 56 for the starwheel conveyor 58 with shaft 56 being suitably supported by brackets 31' or the like. If desired, and as indicated in FIG. 6, chain 52 can also be trained about a suitable idler sprocket 55. Shaft 30 in addition to carrying gear 28 carries a sprocket 59 at the free end thereof and sprocket 59 drives a chain 60 that encircles a further sprocket 61 affixed to the elongated shaft 62 in a manner well known in the art. Attached to the opposing free end of shaft 62 in the area of starwheel drive mechanism 49 is a sprocket 63.

Sprocket 63 through the medium of a chain 63' drives the tail stock sprocket 64 affixed or keyed to the hollow tail stock shaft 65. Support brackets 66 and 67 can be used to mount the shaft 40 and drum 43 on a platform P located adjacent the tool pack end of the bodymaker 11 as well as to support the main housing assembly 68 for the trimmer. In addition to being supported on platform P and as noted above, housing assembly 68 may be further anchored to the tool pack portion of bodymaker 11 by way of the various bracket assemblies 31 or 31' in a manner well known in the art.

From the above description, it will be readily observed that the various elements generally making up and controlling the operational movements of the trimmer as well as the feeds for the trimmer are ultimately powered and directly connected to the main drive for the press 11 whereby the operating speeds and movements of the aforesaid elements are fully coordinated and synchronized one with another.

Figure 3:
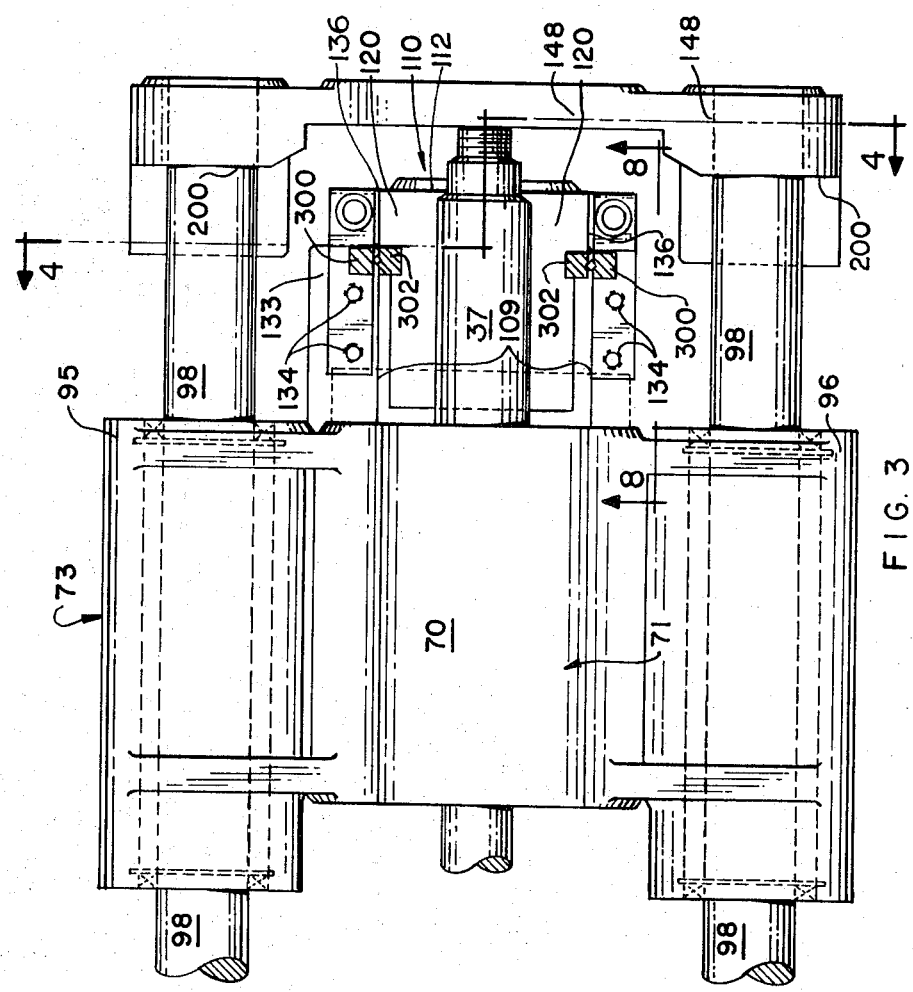
FIG. 3 is a broken sectional view generally taken along the line 3—3 of FIG. 2, with parts added and other parts removed.
Figure 4:
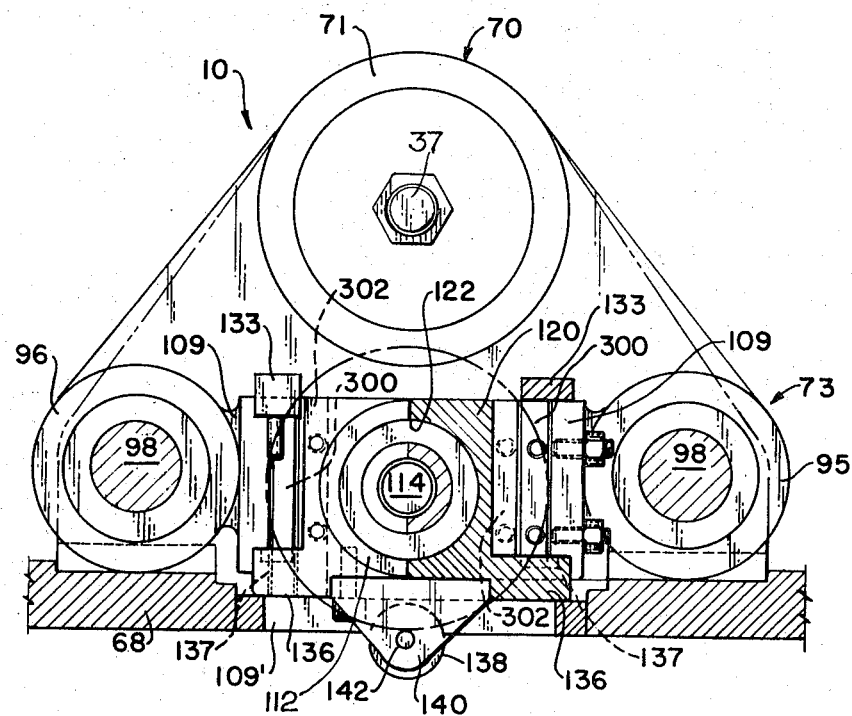
FIG. 4 is a view generally taken along the line 4—4 of FIG. 3 with parts added and other parts removed.
Figure 5:
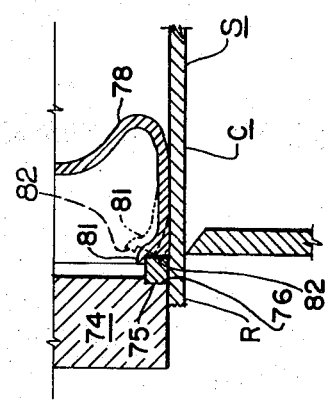
FIG. 5 is a somewhat schematic view of the outside and inside cutters of the trimmer device when taken within the area of the circumscribing line 5 of FIG. 2 and illustrates how the outside cutter when actuated by a suitable cam mechanism cuts into and through the wall of a seamless can body to trim the ragged edge therefrom.

The trimmer mandrel 38 along with shaft 37 is carried by and projects from the laterally shiftable carriage assembly 70 schematically illustrated in FIG. 1 and shown in detail in FIGS. 2, 3 and 4. Carriage assembly 70 includes a top barrel-like portion 71 provided with bearing assemblies 72 for the mandrel drive shaft 37 and a lower hollowed and skirted section 73. The mandrel 38 projects forward or somewhat to the right of the barrel portion 71 as viewed in FIG. 2. Mandrel 38 includes a stepped and hollowed out rotatable annular backup section 74 and a ringlike knife or cutter element 75 which fits within the stepped portion 76 of the backup section 74. In my prior copending application, mandrel 38 included a plurality of radially disposed and somewhat elliptically shaped compressible fingers 78 that projected from and were integrally formed with a central apertured hub section 80. The piece of metal from which hub section 80 and fingers 78 are formed was a commercial grade spring steel hardened and tempered to the desired hardness. Radial cuts or slits appropriately made in the piece of metal from which the finger elements and hub were integrally formed provided for spaces whereby the various fingers 78 were separated from each other, functioned individually and could be independently flexed inwardly or outwardly without affecting or disturbing the movements or positions of other fingers. The free ends 81 of the individual fingers 78 were provided with tips 82 that normally were compressed against and bear against the inside surface of knife ring 75. These fingers also formed the leading edge of the mandrel. Because of the resiliency and compressibility of fingers 78, they were adapted to move into the interior of a metal can or container C, as the mandrel was advanced to the right a relatively small but sufficient amount for the fingers to firmly grip the inside wall of the can C being handled and forced the bottom of the can against the end 83 of the rotatable tail stock holder 84 mounted on shaft 65 as indicated in FIGS. 2 and 5. In the case of this slight can body penetration and support, it was found, for example, that penetration of from 1 to 1½ inches by fingers 78 was sufficient for drawn and ironed aluminum can bodies which in their untrimmed condition may have a depth or length of from 5 to 7 inches.

Figure 9:
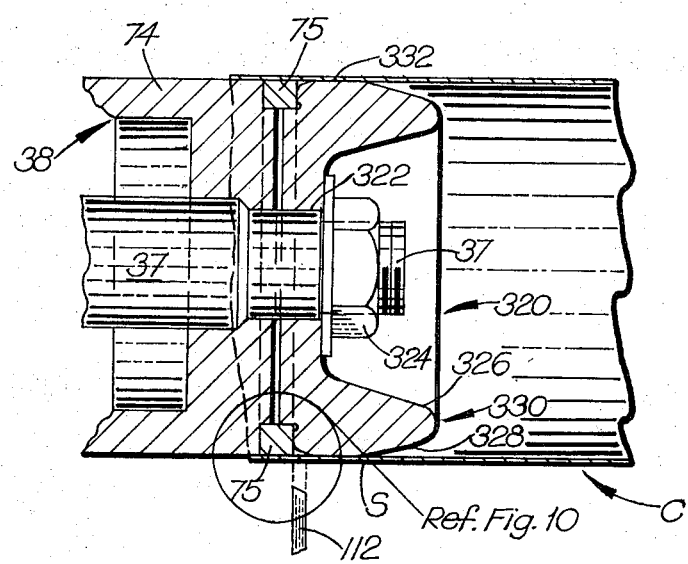
FIG. 9 is a sectional view of the cutting anvil of the instant invention and illustrates in a manner similar to FIG. 5 how the anvil cooperates with the outside and inside cutters during the trimming of the ragged edge from the open end of a can.
Figure 10:
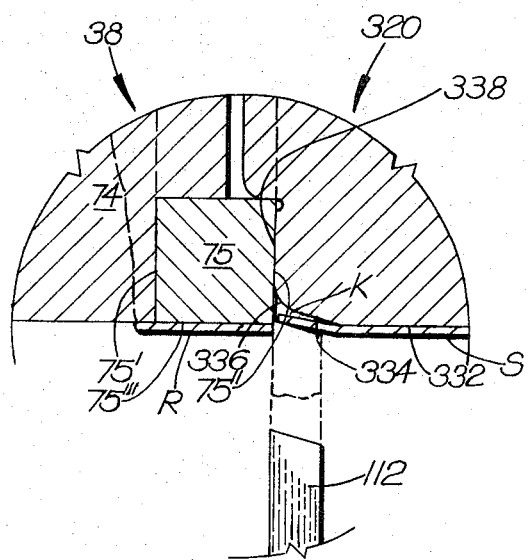
FIG. 10 is an enlarged sectional view taken generally within the circumscribing line 10 of FIG. 9 and with the full trimming action of the inside and outside cutters being shown.

In accordance with the instant invention and as indicated, particularly in FIGS. 9 and 10, a unique rigid and solid annular cutting anvil 320 of shallow construction and appropriately hardened tool steel can be used in lieu of the compressible fingers 78 of my copending application to support the can from the inside and adjacent the outside cutter 112 in an improved fashion during the time the outside cutter 112 cooperates with the inside cutter 75 to sever the ragged end R from the main body of the container C.

This anvil 320 is somewhat cup-shaped and provided with a bore 322 for receiving the threaded end of shaft 37. Anvil 320 is anchored to shaft 37 by a standard lock nut 324 and both the inside and outside wall surfaces 326 and 328 of anvil wall 330 are tapered. Wall 330 forms the leading edge of the mandrel and the taper of outside wall surface 328 is used to advantage in insuring proper entry of the anvil 320 into the interior of the container C being trimmed. The degree of penetration of a can by anvil 320 is shallow and substantially the same small amount as that of the fingers 78 previously described. The remaining outer peripheral dimensions of the anvil 320 are such that the can body C will readily, yet snugly slide and fit over the main outer anvil support surface 332. The forward end of anvil surface 332 merges with outside cup wall surface 328, while the rearward or trailing end of anvil surface 332 merges with a tapered surface 334 followed by a small radius 336. The taper of surface 334 is less pronounced than that of wall 328 and can be on the order of a 15° taper relative to surface 332 while radius 336 can be on the order of 3/64 of an inch. Anvil 320 is also provided with an annular stepped portion 338 similar to the stepped portion 76 of mandrel backup section 74 for receiving a section of inside cutter 75. Thus, inside cutter 75 can be sandwiched in between and removably yet firmly held in place by anvil 320 and the backup section of mandrel 38. Because of the firm backup of inside cutter 75 now provided by the rigid anvil 320 on the one side and the rigid backup section 74 of mandrel 38 on the other side malfunctioning of the trimmer due to a remote but possible catching or jamming of the flexible fingers with the inside cutter is eliminated. Further, the availability of open or relief area K provided by tapered surface 334 and radius 336 at all times means that even if the trimmer cutter 112 is by some remote possibility accidentally pushed upward during idling of the trimmer and with no can body C to be cut located on anvil 320, no damage will occur to the cutter 112 or anvil 320 since the cutter 112 would merely penetrate the open space K and not contact anything solid, such as the flexible fingers 78 of my prior copending application.

In an advantageous embodiment of the invention, the inside cutter 75 can have identical twin cutting surfaces 75' and 75''. Thus, whenever the first cutting surface becomes dull, e.g. surface 75'', the operator need only unlock nut 324, remove anvil 320 and reverse the position of cutter surfaces 75' and 75'' with surface 75' now assuming the former position of surface 75'' and vice versa. In other words, the life of cutter 75 can be prolonged and doubled without the necessity of being sharpened. The manner in which the cutter 75 is now solidly anchored in place by the anvil 320 and mandrel section 74 preserves the integrity of the sharpness of reserve surface 75' until it is to be used.

The open or relief area K located adjacent the trailing end of the anvil 320 and its main container support surface 332 is relatively small yet sufficient to permit the side wall S of the can body being trimmed to be deflected inwardly the slight amount relative to the outer periphery 75''' of cutter 75 to effect the desired and complete severing of the ragged can edge and ring R from the can body proper. Because of the taper of wall surface 334 of the anvil 320 and the relatively small or slight amount of inward deflection of the final trimmed edge of the can body C, the can body C can be readily stripped from the mandrel 38 at the end of the trimming operation, all as will be hereinafter described.

As indicated in FIG. 2, the powered and rotatably driven tail stock holder 84 can comprise an apertured cup-shaped element that is fitted on and locked to shaft or spindle 65 driven by sprocket 64 also secured to hollow shaft 65. The elongated bore 86 of shaft 65 is advantageously flexibly connected in a manner well known in the art to an air line 88. Line 88 is connected by a three-way valve 89 which is controlled by cam 156 attached to shaft 48 in a manner to be described and valve 89 is connected to compressed air line 90 and vacuum line 91 in a fashion well known in the art. Operation of valve 89 in a manner to be described alternately results in a vacuum being pulled on the end of a can C seated in tail stock holder 84 or a pulse of air being directed against the bottom of the can depending upon the particular cycle of operation of the trimmer 10.

As indicated particularly in FIGS. 2, 3 and 4, movable carriage 70 which can be made in the form of a casting is arranged on main housing 68 and adjacent the subhousing 92 that is rigidly affixed to main housing 68. Subhousing 92 is used to mount bearing assemblies 94 for the splined shaft and bearing assembly 36 for splined shaft 37. From the above, it will be observed that, when carriage 70 is shifted along with shaft 37 forward or to the right as viewed in FIG. 2 and then back to the left, shaft 37 will always remain in driving contact with shaft 30 and continue to rotate during all of the aforesaid movements.

Carriage 70 and subhousing 92 can be somewhat triangulated in cross-sectional configuration such that the lower sections thereof, e.g. section 73 of carriage 70 and section 93 of subhousing 92, can be provided with lower offset barrel sections, such as the barrel sections 95 and 96 for carriage 70. Support rods 98 fit in openings in the lower sections 73 and 93 and these rods advantageously slidingly support movable carriage 70.

The lower section 73 of the casting making up carriage 70 is hollowed out to form a pocket 100 and this pocket is fitted with a cam follower assembly 102 that includes the cam follower 104 attached to the spindle 105. As indicated particularly in FIG. 2, the cam follower 104 is adapted to fit and move within the track 106 in the cam sleeve 44 as the drum 43 fitted with sleeve 44 rotates.

In order to adjust the trimmer device 10 for trimming can sidewalls of different heights, means are provided for adjusting the position of the tail stock holder and can support 84 relative to the stripper assembly 145. These means include a keyway 84' made up of a pair of standard slide bars 85' between which the base 86' of the movable bearing assembly housing 152 fits as it rests on the slotted base support 87'. When the nuts 88' for the threaded bolts 80' secured to base 86' and which protrude through the elongated slots 89' in base support 87' are loosened along with the several different lock nuts 100' for the threaded pin 101' used to adjustably anchor the wall 102' for the base of the housing 152 to the fixed anchor plate 103', overall housing 152 along with holder 84 can be appropriately moved or shifted forward or backward the requisite small amount to accommodate the particular sized can to be trimmed in accordance with a given production run. If desired, appropriate vernier scale markings can be placed on the slide bars 85' and the base 86' to indicate the different sized cans to be trimmed and for ready adjustment of the tail stock holder. Since sprocket 64 is adjustably locked to the shaft 65 in a manner well known, it can be also loosened at the same time on shaft 65 and then moved the requisite amount backwards or forwards and again locked to shaft 65 in order to maintain engagement with sprocket 63. Cam follower 104 is resiliently mounted in pocket 100 in the following fashion. Follower 104 is freely mounted on a spindle 105 that is threadedly affixed to a carrier bar-like element 105'. Bar 105' fits loosely in the pocket 100 and one end of the bar 105' contains a stepped bore 106' within which a spring biased centering pin 107 is located. Surrounding pin 107 is a compression spring 108. Compression spring 108 bears against the forward part of pocket 100 and the forward edge of bar 105' and tends to force carrier bar 105' away from the forward wall of pocket 100 at all times. The significant action and the importance of this spring 108 during the can body wall cutting operation will be described more fully hereinafter.

The central forward portion of carriage section 73 is provided with a pair of arms 109 that are formed integrally with the rest of the casting making up carriage 70. These arms project forwardly of carriage section 73 and serve to support a rotatable outside cutter assembly 110 therebetween. Cutter assembly 110 is comprised of a rotary cutter blade 112 mounted on shaft 114 and locked to shaft 114 by lock nut 116. This cutter 112 is adapted to rotate by a rotating can body that it contacts during the cutting operation. Shaft 114 is freely mounted by the standard bearing assembly and fittings 118 located within the cutter housing 120 that is resiliently and slidably supported on and between arms 109 and in the opening 109' in the main housing assembly 68 in the following fashion.

Cutter housing 120 can be machined from an elongated and squared off block of steel whereby it is provided with a central cavity 122 which is closed off at the back by a closure plate 134 and sealed in at the front by an oil seal 126. The bearing assembly and fittings 118 are appropriately clamped in place within housing 120 and upon being so clamped rotatably lock the shaft 114 to the housing 120. Housing 120 is slidingly mounted between arms 109 by means of upright roller bearing slide assemblies 300 and 302 suitably secured to the arms 109 and housing 120 respectively.

Figure 8:
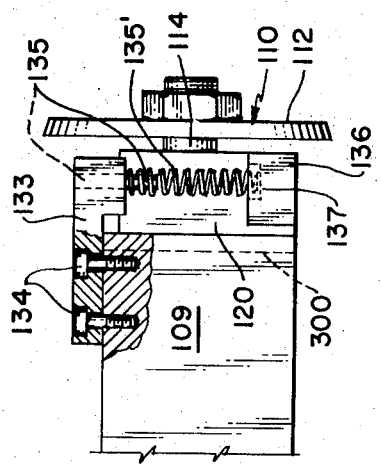
FIG. 8 is a broken elevational view of the outside cutter carrier taken generally along line 8-8 of FIG. 3 with parts added and other parts removed.

As indicated particularly in FIGS. 3, 4 and 8, a stepped bar 133 is attached by bolts 134 to the top forward part of arms 109. Depending from the forward end of a bar 133 is pin 135 which is surrounded by a compression spring 135'. The upper portion of this spring bears against the underside of the bar 133 while the bottom of the spring bears against the wing element 136 formed integrally with housing 120 as it seats itself in a counter-bored well section 137 thereof.

As further indicated in FIGS. 3 and 4, the lower front end of cutter housing 120 has a roller 138 dependingly affixed thereto by means of brackets 140 and pin 142. Roller 138 acts as a cam follower, which is adapted to contact and follow the contour of the cam surface on cam 143 located at the forward end of the rotatable drum 43 while at the same time being secured to drive shaft 40 as well as to drum 43.

Roller 138 engages the cam surface on cam 143 at the time carriage 70 reaches the end of its forward stroke and it will remain forwardly extended for a sufficient period of time to allow roller 138 to move along the cam 143 and force the cutter housing 120 and cutting 112 upwardly against the action of springs 135' and against the sidewall of a can C in a manner to be described. This all takes place as the main carriage 70 is moved forward under the influence of the cam follower 104 moving in the track 106.

Fixedly secured to main housing and bracket assembly 68 closely adjacent the mandrel 38 and intermediate the mandrel 38 and tail stock 84 is a can stripper device 145 comprised of a circular ring 146 shrink fitted within the stepped portion of an annular upstanding bracket 148 mounted on the side pedestals 150 appropriately secured to the main housing section 68.

Stripper device 145 engages the severed ragged edge ring R of the can as the main mandrel section and mandrel fingers 78 retract and push the ragged and severed edge ring R from the mandrel assembly so the ring can be disposed of. Prior to a detailed discussion of the operation of the trimmer 10, it is to be observed that the tail stock assembly 84 and shaft 65 are carried in the bearing assembly housing 152 secured to main bracket and housing assembly 68 and three-way valve 89 is operated by a conventional valve control roller element 154 that is maintained in contact with the cam 156 affixed to the one free end of drive shaft 48 which also operates the starwheel indexing device 49. It is to be further observed that, because the common drive shaft 20 is directly connected as aforedescribed to both drive shafts 37 for the mandrel 38 and shaft 65 for the tail stock holder 84, both the mandrel 38 and holder 84, the two main elements that engage the container, will be driven or rotated at the same r.p.m. and in the same direction.

An operating cycle of the trimmer device 10 utilizing the anvil 320 will now be described. As the can bodymaker 11 cycles and draws and irons a can or container C, a previously drawn and ironed container C that has been deposited in a starwheel conveyor pocket 306 will be rotated by the starwheel conveyor indexed by mechanism 49 to a position axially aligned with and intermediate mandrel 38 and tail stock holder 84 and with its open end facing the mandrel 38. While this action takes place, the cam follower 104 moving along the rotating track 106 will initiate the forward and fully synchronized movement of carriage 70 and rotating mandrel 38.

During this forward movement of mandrel 38, cutter housing 120 also moves simultaneously forward in a selectively spaced relation to the mandrel 38. At the same time, the outside or rotary cutter 112 remains spaced from the ring knife or inside and constantly rotating cutter 75 and the sidewall of the can C until the can C is partially penetrated by the improved anvil 320 of the instant invention in lieu of the springy mandrel fingers 78 of my copending application. As the mandrel 38 moves forward, it also projects the anvil 320 past the stripper ring 145 and free from the influence of the ring.

When the mandrel 38 reaches its maximum forward stroke a limited but maximum shallow penetration of a can body C located in a pocket 306 of the starwheel 58 takes place, all in a manner similar to that shown in dotted lines in FIG. 2 with respect to the fingers 78 of my copending application and in more detail in FIGS. 9 and 10 as regards anvil 320. At the same time, the following operations will occur. First of all, the can body C is caused to be gently slid over and about anvil surfaces 328 and 332 concurrently with becoming slightly displaced from its associated pocket in wheel 58. This slight displacement will be sufficient to free the can body C from wheel 58 and allow the can body C to spin or rotate freely along with mandrel 38 and tail stock holder 84 which at this time engages the bottom of the can. At this time also the rotating cam 156 on drive shaft 48 will have operated the air valve 89 such that vacuum line 91 will be connected to main line 88 and bore 86 of spindle 65 and a suction pulled against the bottom of the can body C to insure the affixation and a locking of the can body to the backup tail stock holder 84 by virtue of the valve 89 simultaneously blocking off air from line 90 that is connected to an air pump or compressor (not shown) in a manner well known in the art.

When carriage assembly 70 reaches the end of its forward stroke, the carriage assembly barrel sections 95 and 96 will bottom on the inside surfaces 200 of the bracket 148 thereby locking cutter 112 in the can wall cutting position as the cam roller 138 fitted to the cutter housing 120 simultaneously fits over and momentarily locks onto rotating cam 143. This locking results in roller 138 moving upwardly under the influence of cam 143. The outside cutter housing 120 and cutter 112 are next forced upwardly against the influence of springs 135' as these springs are compressed until the cutter 112 contacts the rotating wall of can C and then starts to rotate by and along with the rotating can C as it penetrates the can wall. During the can wall cutting operation, cutter 112 meshes scissors fashion with cutter surface 75'' of inside cutter 75 as cutter 112 cuts through the sidewall S of the can body C and penetrates open area K adjacent the inside terminus of anvil support surface 332.

During this time, the spring biased bar 105' that carries cam follower 104 will be moved forward until the cam follower 104 reaches the dwell point in track 106. During the full dwell period of follower 104 at which time the can wall cutting operation continues, spring 108 remains advantageously biased against the front wall 73 of housing assembly 70 so as to force the barrel sections 95 and 96 thereof to maintain bearing contact with inside surfaces 200 of bracket assembly 148 and in effect maintain both cutter 112 and cutter 75 in the same cutting plane and cutting relation to a given peripheral portion of the can wall S during the full cutting operation. This means that a good clean uniform and non-spiral cut of the can body wall will take place along the entire periphery of the can wall and always at substantially the same distance from the bottom of the can so that the finished can will have a uniform height throughout. The cutter 112 in contacting the rotating can will be correspondingly rotated along with cutter 75 as the cutter 112 penetrates the can sidewall.

As the cutter 112 moves up in offset relation to rotating inside cutter 75, being maintained in alignment as aforesaid with a given peripheral portion of the can body sidewall S, the can sidewall will be cleanly severed by the cutters 112 and 75 leaving the ragged edge ring R free of and fully separated from the can body C, as the cutter 112 penetrates the open area K located intermediate cutter 75 and the inside terminus of anvil wall 332. The cutter 112 operates to cut the ragged edge from the can body by penetrating the sidewall of the can adjacent to and offset from the rotating cutter on the inside of the can. By cutting the can sidewall in this fashion, any slight burr that may form will usually form on the outside of the can where it will not interfere with further handling of the same or damage delicate pieces of equipment such as decorating equipment. The anvil surface 332 provides a firm solid support for the container wall S on one side of the cutting or trimming area or zone while the outer peripheral surface 75''' of cutter 75 provides a similar support for the ragged edge of the container wall S on the other side of the cutting or trimming zone.

In the use of the anvil 320 it has been found that, so long as its inside terminus is provided with an appropriate relief or open cutting area K provided by tapered surface 334 and radius 336 along with a means, such as spring 108, to resiliently bias carriage assembly 70 during the full cutting operation, the anvil 320 can be used for the spring fingers 78 of my prior and copending application to obtain a non-spiral and uniform cutting of the can sidewall. The solid rigid construction of anvil 320 also provides for a more rugged piece of equipment that is capable of withstanding substantial abuse, wear and tear.

Continued rotation of the drum 43 means that the cam sleeve 44 and cam 143 allow roller 138 to drop down under the influence of springs 135' until the bottom ears 136 on housing 120 contact the shoulders on the base plate 68, all as indicated in FIG. 4. As the cutter 112 drops away from the cam body by virtue of this movement of the housing 120, cam follower 104 moving in track 106 at substantially the same time forces the carriage 70 backwards along with the mandrel 38, anvil 320, cutter housing 120 and cutter 112. After the carriage 70 and other elements completely retract the can body C will be free of anvil 320 and cam 156 will then be in the proper position to reactivate air valve 89 through the medium of roller 154 whereby the flow of air in line 88 will be reversed with air being forced against the bottom of the can on the tail stock holder 84 to effect a dislodging of the cam body from the tail stock holder 84 so that the can body C can now settle back into its associated carrier pocket 306 in the starwheel 72.

The starwheel 58 at this time will be indexed by its indexing mechanism 49 to a can body discharge position somewhat schematically shown in FIG. 6 while at the same time bringing a new can body C into position to be trimmed. As the mandrel 38 moves back along with anvil 320 and through the stripper assembly 145, the scrap ring R will be caught up on the stripper ring 146 and disengaged or stripped from the mandrel 38. This means the scrap ring R can now drop free from the can body C as the mandrel anvil 320 backs off and becomes disengaged completely from the can body and the can body C is allowed to settle back into its associated starwheel pocket. If desired, means, such as an air jet assembly of conventional design and not shown, may be used to direct a blast of air against the scrap ring R so as to direct it towards an appropriately positioned scrap container not shown. As indicated in FIGS. 1 and 6, a suitable can discharge conveyor chute 310 can be located below the tail stock assembly 84 for receiving the trimmed can bodies from the indexing starwheel conveyor 58 in a manner well known in the art and for transferring the finished can bodies to further treatment stations, etc.

Figure 7:
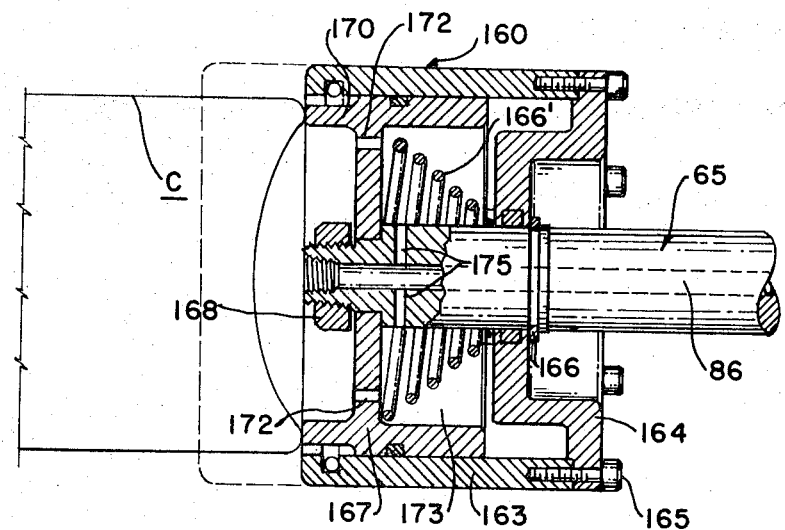
FIG. 7 is a sectional view of a modified tail stock holder.

In an advantageous embodiment of the invention and as indicated particularly in FIG. 7, a modified tail stock holder 160 may be used in lieu of holder 84. Holder 160 is made up of a cylinder 163 fitted with a stepped apertured bottom 164 and secured to the cylinder by standard machine screws 165. Bottom 164 is fitted over the threaded end of hollow shaft 65 and one side of bottom 164 abuts backup ring 166 while the other side of bottom 164 is biased by spring 166' against the plunger-like annulus 167 rigidly locked to shaft 65 by lock nut 168. This tail stock holder 160 operates as follows. When the bottom of a can body C contacts the annular rib 170 on plunger 167, air will be evacuated first from the chamber formed between the can bottom and plunger 167 through ports 172 in plunger 167, chamber 173 between plunger 167 and bottom 164, ports 175 in shaft 65 and central bore 86 in shaft or spindle 65. The continued exhaustion of air through bore 86 in shaft 65 will cause sleeve 160 to compress the spring 166' and slide over the outer surface of the can whereby the can bottom will be brought a selected amount below the level of the open top or edge of the cup-shaped holder 160 so that the can body will be fully stabilized during the trimming operation. When the vacuum is cut off and compressed air reintroduced through line 88, etc., as noted above at the end of the trimming operation, sleeve 160 will move backwardly so that the trimmed can body can be released from tail stock holder 160 in the same fashion as from holder 84.

An advantageous embodiment of the invention has been disclossed and described. It is obvious that various changes and modifications may be made therein without departing from the appended claims, wherein;

What is claimed is:

1. A device for trimming an open ended metal can and the like comprising the combination of a carriage, a rotatable outside cutter and a rotatable mandrel mounted on said carriage, said mandrel including an inside cutter and rigid anvil means provided with a can support surface, a rotatable tail stock holder and support spaced from but axially aligned with said mandrel, conveyor means for selectively supplying an open ended can to said mandrel and said tail stock holder and support, drive means synchronized with said conveyor means for selectively shifting said carriage relative to said conveyor means to effect an insertion of the anvil means along with the inside cutter a relatively small amount into an open ended can supplied to the trimming device by the conveyor means and to cause a displacement of the open ended can relative to said conveyor means and a bottoming of the can upon and against said tail stock holder and support, means for moving said outside cutter into cutting contact with a selected portion of the sidewall of the can and along a cutting plane located in offset relation to said inside cutter and the can support surface of the anvil means when the can is displaced from the conveyor means so as to produce a uniform nonspiral trimming and severing of the entire ragged open end of the can from the remainder of the can and biasing means for holding the outside cutter in the said cutting plane and relative to said selected portion of the can sidewall during the full trimming operation to effect said uniform and non-spiral trimming of the can sidewall.

2. A device as set forth in claim 1 wherein a portion of the anvil means located adjacent the can support surface thereof is provided with a relieved area which defines an opening for receiving the outside cutter after the outside cutter cuts through the sidewall of the can.

3. A device as set forth in claim 1, wherein said anvil means is provided with pocket means for removably receiving and anchoring the inside cutter in a cutting position.

4. A device as set forth in claim 1 wherein the drive means for shifting the carriage comprises a cam and cam follower means.

5. A device as set forth in claim 1 wherein said means for moving said outside cutter into cutting contact with the sidewall of the can comprises a cam means.

6. A device as set forth in claim 1 including a common drive means for rotating said mandrel and said tail stock holder and support at the same rate of speed.

7. A device as set furth in claim 1 including a stripper means associated with said mandrel for stripping the scrap ring of ragged end material resulting from the cutting operation and the trimmed can from the mandrel as the carriage and mandrel are returned to their original starting positions at the end of the cutting operation.

8. A device as set forth in claim 1 including means for resiliently mounting the outside cutter on the carriage.

9. A device as set forth in claim 1 including a common drive means for rotating said mandrel said tail stock holder and support said carriage shifting drive means and said conveyor means.

10. A device as set forth in claim 1 wherein said tail stock holder and support are provided with valve and piping means for selectively placing a vacuum upon or directing a pulse of air against the bottom of a can in contact with the tail stock holder and support.

11. A device for trimming an open ended metal can body and the like comprising the combination of a carriage, a rotatable outside cutter and a rotatable mandrel mounted on said carriage, said mandrel being provided with an inside can body cutter and rigid anvil means provided with a can body support surface, a rotatably tail stock holder and support spaced from but axially aligned with said mandrel, a conveyor means for supplying open ended can bodies to said mandrel and said tail stock holder and support, means for operating said conveyor means and for intermittently aligning an open ended can body located on said conveyor means with said mandrel and tail stock holder and support, drive means synchronized with said conveyor means for selectively shifting said carriage relative to said conveyor means so as to insert said rigid anvil means along with said inside cutter a relatively small amount into an open ended can body located on the conveyor means and in supporting relation thereto and to cause a displacement of the can body relative to the conveyor means and a bottoming of the can body upon and against said tail stock holder and support, means for moving said outside cutter into cutting contact with a selected portion of the sidewall of the can body held between the rigid anvil means and tail stock holder and support and along a cutting plane located in offset relation to said inside cutter and the can body support surface of the anvil means as the can body remains displaced from the conveyor means so as to effect a substantially uniform and non-spiral trimming and severing of the entire ragged open end portion of the can body from the can body paper and biasing means for holding the outside cutter in the same cutting plane relative to the said selected portion of the can body sidewall during the complete trimming and severing operation to assure said uniform and non-spiral trimming and severing of the ragged open end portion of the can body.

12. A device as set forth in claim 11 wherein the portion of the anvil means located adjacent the can support surface thereof is provided with a relief area which defines an opening for receiving the outside after the outside cutter cuts through the can body sidewall.

13. A device as set forth in claim 11 wherein the anvil means is provided with pocket means for receiving and anchoring the inside cutter in a cutting position.

14. A device as set forth in claim 11 including a common drive means for rotating said mandrel and said tail stock holder and support at the same rate of speed.

15. A device as set forth in claim 11 including a stripper means associated with said mandrel for stripping the scrap ring formed by the severed ragged open end portion of the can body and trimmed can body from the mandrel at the end of the cutting operation as the carriage and mandrel are returned to their original starting positions.

16. A device as set forth in claim 11 including means resiliently mounting the outside cutter on the carriage.

17. A device as set forth in claim 1 including a common drive means for rotating said mandrel said tail stock holder and support said carriage shifting drive means and said conveyor operating means.

18. A device as set forth in claim 11 wherein said tail stock holder and support are provided with valve and piping means for selectively placing a vacuum upon or directing a pulse of air against the bottom of a can body in contact with the tail stock holder and support.

19. A device for trimming an open ended metal can and the like comprising the combination of a carriage, a rotatable outside cutter and a rotatable mandrel mounted on said carriage, said mandrel including an inside cutter and rigid anvil means provided with a can sidewall support surface, a rotatable tail stock holder and support spaced from but axially aligned with said mandrel, an indexing pocketed conveyor means for supplying an open ended can to said mandrel and said tail stock holder and support, means for indexing said conveyor means to successively align the pockets thereof and the open ended cans in said pockets with said mandrel and tail stock holder and support, drive means synchronized with said conveyor means for selectively shifting said carriage relative to a given pocket of said conveyor means during a dwell period of said conveyor means so as to insert said rigid anvil means along with the inside cutter a relatively small amount into an open ended can located on the conveyor means and cause a slight displacement of the can relative to said given pocket of the conveyor means and a bottoming of the can upon and against said tail stock holder and support, means for moving said outside cutter into cutting contact with a selected portion of the sidewall of the can and along a cutting plane located in offset relation to said inside cutter and the can sidewall supporting surface of the anvil means when the can is displaced from the pocket of the conveyor means so as to effect a uniform and non-spiral trimming and severing of the entire ragged open end portion of the can from the remainder of the can and biasing means for holding the outside cutter in the same cutting plane relative to said selected portion of the can sidewall during the full trimming operation to insure said uniform and non-spiral trimming and severing.

20. A device as set forth in claim 19 wherein a portion of the anvil means located adjacent the can sidewall support surface thereof is provided with a relief area which defines an opening for receiving the outside cutter after the outside cutter cuts through the sidewall of the can.

21. A device as set forth in claim 19 wherein said anvil means is provided with pocket means for receiving and anchoring the inside cutter to the mandrel and in a cutting position.

22. The device as set forth in claim 19 wherein said tail stock holder and support are provided with valve and piping means for selectively placing a vacuum upon or directing a pulse of air against the bottom of a can in contact with the tail stock holder and support.

23. A system for handling and transferring a drawn and ironed metal can from a draw and iron press to a can trimming device where the open end of the can is trimmed and the trimmed can then discharged onto a takeoff conveyor while the trimmed scrap material is removed from the trimming device comprising the combination of a draw and iron press, a power means for said press, a device for trimming the ragged ends of the cans drawn and ironed on said press from the cans, said device being disposed adjacent the tool end of said press and comprising the combination of a carriage, a rotatable mandrel mounted on the carriage, said mandrel also being provided with an inside cutter and rigid anvil means having a can sidewall support surface, a rotatable tail stock holder and support spaced from but axially aligned with said mandrel, an indexing pocketed conveyor means for supplying a can to said mandrel and said tail stock holder and support, means for indexing said conveyor means to successively align the pockets thereof and the open ended cans in said pockets with said mandrel and tail stock holder and support, means synchronized with said conveyor means for selectively shifting said carriage relative to a given pocket of said conveyor means during a dwell period of said conveyor means so as to insert said rigid anvil means and inside cutter a relatively small amount into an open ended can located on the conveyor means and cause a slight displacement of the can from its associated conveyor means pocket and a bottoming of the can upon and against said tail stock holder and support, means for moving said outside cutter into cutting contact with a selected portion of the sidewall of the can and along a cutting plane located in slight offset relation to said inside cutter and the can sidewall support surface of the anvil means when the can is displaced from the pocket of the conveyor means so as to effect a uniform and non-spiral trimming of the ragged open end of the can, means for rotating said mandrel and tail stock holder and support, means for driving said carriage shifting means, power takeoff means connecting said press power means to said mandrel as well as to said tail stock holder and support rotating means and to said carriage shifting means and to said conveyor means indexing means and biasing means for holding the outside cutter in the same cutting plane relative to said selected portion of the can sidewall during the full trimming operation to insure said uniform and non-spiral trimming.

24. A device as set forth in claim 1 including means for adjusting the position of said tail stock holder and support.

25. A device as set forth in claim 11 including means for adjusting the position of said tail stock holder and support.

* * * * *

UNITED STATES PATENT OFFICE
CERTIFICATE OF CORRECTION

PATENT NO. : 3,864,995
DATED : February 11, 1975
INVENTOR(S) : Cornelis Langewis It is certified that error appears in the above-identified patent and that said Letters Patent are hereby corrected as shown below:

Column 8, lines 51 and 52, "cutting" should be --cutter--

Column 13, line 46, "paper" should be --proper--

Column 13, line 56, "outside after" should be --outside cutter after--

Column 14, line 5, "1" should be --11--

Signed and sealed this 20th day of May 1975.

(SEAL)
Attest:

RUTH C. MASON
Attesting Officer

C. MARSHALL DANN
Commissioner of Patents
and Trademarks